Oct. 20, 1970 H. S. ODEN 3,535,689

METHOD AND CIRCUIT ARRANGEMENT TO CONNECT SUBSCRIBER TELEPHONE STATIONS AND HANDSETS VIA RADIO IN TELEPHONE SYSTEMS

Original Filed Aug. 26, 1965

3,535,689
Patented Oct. 20, 1970

3,535,689

METHOD AND CIRCUIT ARRANGEMENT TO CONNECT SUBSCRIBER TELEPHONE STATIONS AND HANDSETS VIA RADIO IN TELEPHONE SYSTEMS

Hoeckley S. Oden, Korntal, Germany, assignor to International Standard Electric Corporation, New York, N.Y., a corporation of Delaware Continuation of application Ser. No. 482,822, Aug. 26, 1965. This application Dec. 27, 1967, Ser. No. 694,015
Claims priority, application Germany, Sept. 1, 1964, St 22,618
Int. Cl. H04b *1/52*; H04m *1/02*
U.S. Cl. 343—175 1 Claim

ABSTRACT OF THE DISCLOSURE

A wireless connection between telephone set and handset is obtained through modulated carrier frequencies. In case several telephone sets are adjacent to each other and for both calling directions different carrier frequencies are used. Power is supplied to charge batteries in the handset when it is inductively in the non-operative condition. During the call condition, the power is supplied from the charged battery.

Figure 1:
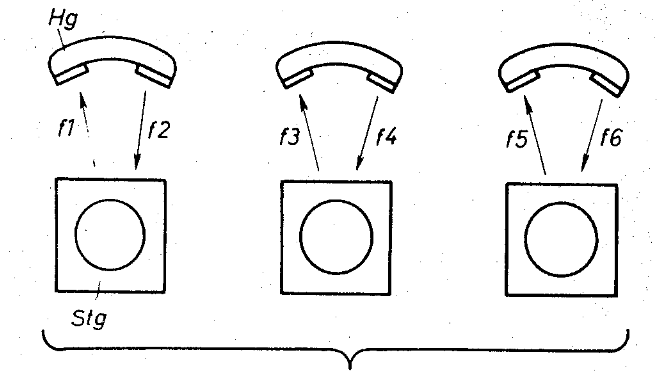

This is a continuation of application Ser. No. 482,822 filed Aug. 26, 1965 and now abandoned.

The invention relates to a method and a circuit arrangement to connect subscriber stations and handsets in telephone systems.

In conventional telephone sets the handset, containing the microphone and receiver capsule, is connected with the station by a multi-wire cord. The wires connect the microphone capsule and the receiver capsule with the cradle transformer, provided in the housing of the telephone set. Through these wires the intelligence signals are transmitted in both directions, outgoing and terminating.

The length of said cord determines how far one can go from the station during a call without disconnecting the calling contact.

This limitation of free movement during a call is very annoying, if one intends to go to a cabinet for looking up a file during the call or if the call should be transferred to another person for which person no seat or standing place is available within the reach of the handset cord, or if it is only intended to stride to and fro during the call. Therefrom the saying was born "tied to the telephone wire."

There are already arrangements known whereby the telephone station is mounted onto a mobile little table (e.g. at a swivelling arm). These arrangements somewhat extend the radius of free movement of the calling person, but do not change the fact that movement is determined by the length of the cord. Moreover these arrangements show the drawback that they require much space, because all objects within the radius of such a swivelling arm are endangered to be damaged or shifted unintentionally.

There are moreover the "hands-free" telephone systems. But such systems show the drawback that all persons present in a room where such a call is carried out are annoyed and moreover they can participate in such a call. Furthermore, it is impossible that two persons carry two separate calls in one single room.

According to the invention subscriber stations are connected to handsets without wires, by means of modulated carrier frequencies. Telephone sets being adjacent in vicinity to the connections between different subscriber stations and their respective handsets use different carriers frequencies.

The connections between microphone and station as well as station and receiver capsule use two different carrier frequencies, in order to minimize sidetone.

The circuit arrangement according to the invention is characterized in this that in each telephone set housing a transmitting device and in the pertinent handset a receiving device is provided, operating with a first carrier frequency. In the handset a transmitting device and in the telephone set housing a receiving device is provided, operating with a second carrier frequency.

The devices accommodated in the handset require energy. It would not make sense to supply this energy via a cable during a call because it would cause the disadvantages outlined in the preamble. The energy in the cordless handset for the therein contained facilities as receiver capsule, microphone, transmitting and receiving device is furnished from a secondary battery, also accommodated in the handset and that the secondary battery in the coordinate handset is charged inductively during the non-operative condition of the handset.

A particularly small secondary battery in the handset is sufficient, if make-contacts are inserted in the current supply circuit of the handset, so that the transmitting and receiving facilities in the handset are switched on only when the cordless handset is lifted. Due to resting-contacts in said handset, no current is used during the non-operative position of the handset.

Furthermore, it is favourable to provide a break-contact in the supply circuit of the secondary battery in the housing of the telephone set, to assume that no hum is produced when the handset is lifted, which hum may interfere with the call.

Figure 2:
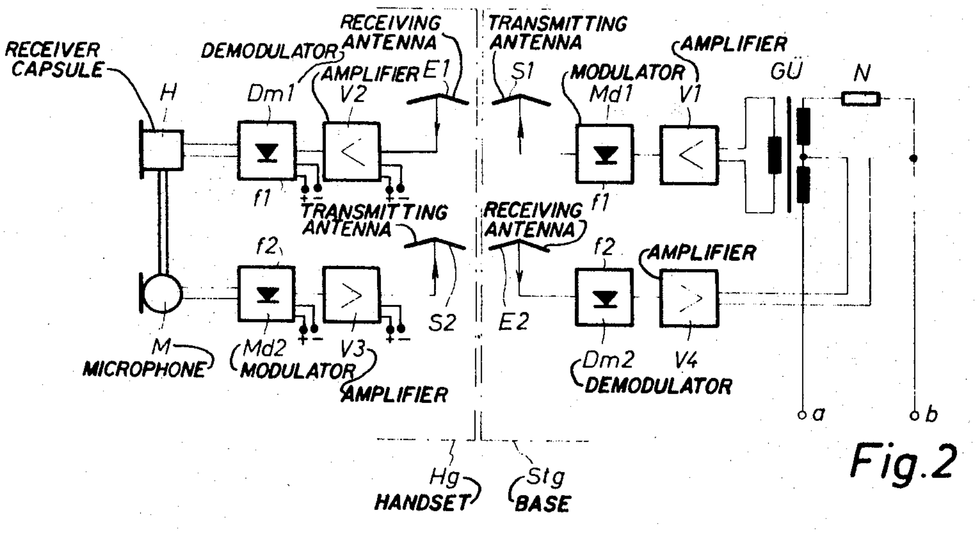
Figure 3:
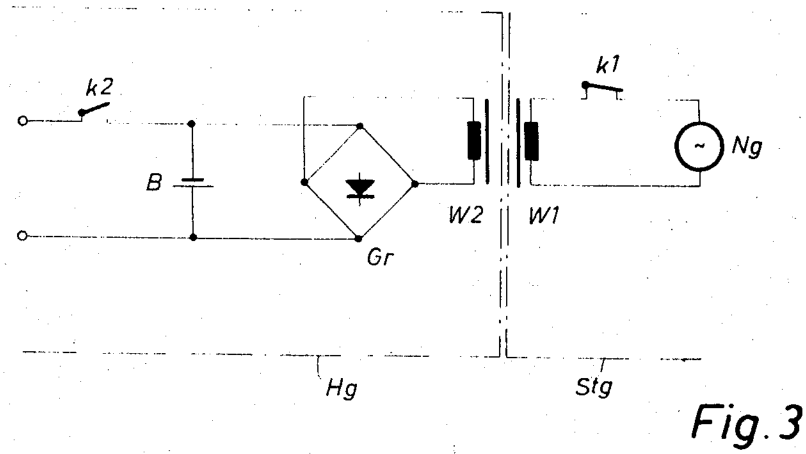

The invention will now in detail be explained with the aid of the accompanying drawings, wherein FIG. 1 schematically depicts the broad inventive concept;

FIG. 2 shows in block diagram form a system for accomplishing the broad inventive concept; and FIG. 3 schematically shows a power supply arrangement for the system of FIG. 2.

As shown in FIG. 1, the base S*tg* and the handset H*g* contain the transmitting and receiving facilities for a cordless connection of both parts. According to the invention the signals between the telephone set and the handset are transmitted, if three telephone sets are located in the vicinity through the carrier frequency *f*1, *f*3 and *f*5, respectively. In the reverse direction between the handset and the telephone station the signals are transmitted through other carrier frequencies *f*2, *f*4, and *f*6, respectively.

FIG. 2 shows the functional block diagram of the circuit arrangement to carry out the method according to the invention. The connection shall be established between the handset H*g* and the base of the telephone set S*tg*. The signals from the subscriber line *a*, *b* reach, via the cradle transformer circuit GÜ with the balancing resistance N, known to the art, an amplifier V1. In the modulator M*d*1 the carrier frequency *f*1 is modulated with the signal frequencies. The said modulated carrier frequency is transmitted from the sender antenna S1 in the housing of the telephone set to the receiving antenna E1 in the housing of the handset H*g*. Via the amplifier V2 and the demodulator D*m*1 the signal frequency is regained and radiated by the receiver H. The outgoing speech frequency signals reach the line *a*, *b* via the microphone M, via the modulator M*d*2, the amplifier V3, the transmitting antenna S2, the receiving antenna E2, the demodulator D*m*2, the amplifier V4, and the cradle transformer GÜ. However, in this direction the wireless connection between handset and telephone station is led through a carrier frequency $f2$. The probably required filters are not shown in said block diagram, the amplifiers V2, V3 in the housing of the handset can be probably omitted.

FIG. 3 shows for example a design of the power supply for the facilities, accommodated in the handset housing H*g*. When the handset is restored the energy is transferred from the mains generator N*g* to the Graetz (bridge-type) rectifier G*r* via the break-contact *k*1 and the transformer W1, W2. Said Graetz (bridge-type) rectifier transforms the A.C. voltages into a D.C. voltage which feeds the secondary battery B. Contact *k*2 is open when the handset is restored so that no energy in the handset is consumed.

When the handset housing H*g* is lifted from the station housing S*tg* the facilities, accommodated in the handset, are power-supplied from the secondary battery B via contact *k*2. The break-contact *k*1 in the telephone set housing is open, consequently the insulated winding W1 so that it cannot radiate a hum.

While the principles of the invention have been described above in connection with specific apparatus and applications, it is to be understood that this description is made only by way of example and not as a limitation on the scope of the invention.

What is claimed is:

1. A system of subscriber telephone sets for use with a plurality of similar type sets at subscriber stations, each of said telephone sets including a base physically and communicatively connected to a different telephone line extending from a central office, a handset individually cooperating with each of said bases to form a complete telephone set enabling a subscriber to communicate over said line by talking into the microphone on the handset and listening to audio signals received from a receiver capsule on the handset, the combination of said base and said handset comprising cooperating radio transmitting and radio receiving facilities including sending and receiving antennae for providing a two-way radio link for coupling two-way communication signals exclusively between each of said handsets and the said base with which said handset cooperates to form complete telephone sets, each of said bases comprising base radio transmitting circuitry using a first carrier frequency, there being a different first carrier frequency individual to each of said plurality of telephone sets whereby said plurality of telephone sets may be physically located proximate to each other without commuicatively interfering with each other, said base further comprising base receiving circuitry adapted to receive on a second carrier frequency, there being a second carrier frequency individual to each of said telephone sets and each of said second carrier frequencies being different than all of the other second carrier frequencies and all of the first carrier frequencies, means for coupling each of said base transmitting and base receiving circuitry to said telephone lines, each of said handsets comprising handset radio receiver circuitry for receiving intelligence on said first carrier frequency of the cooperating base, each of said handsets further comprising handset transmitting circuitry for transmitting intelligence on the second carrier frequency of the cooperating base, hookswitch contact means on each of said bases operated when said cooperating handset is removed from or replaced onto said base, said hookswitch contact means including break contact means being actuated to an open position responsive to said cooperating handset being removed from said base and being actuated to a closed position when said cooperating handset is replaced on the base, battery means for powering each of said handsets, means for inductively charging said battery means while said handset is on said cooperating base with said hookswitch break contacts in the closed position, said means for inductively charging said battery means comprising generator coupling means in each of said bases for coupling said bases to alternating current generator means, first winding means in each of said bases, second winding means in each of said handsets for conductively coupling said handsets to said bases, bridge rectifier means coupled between said second winding means and said battery means, said hookswitch break contact means being in series with said generator coupling means and said first winding means to enable current to flow through said first winding from said generator when said hookswitch contact means is in the closed position, and each of said handsets being equipped with handset switch means for energizing the handset radio transmitting and receiving circuitry only when said handset is removed from said cradle means.

References Cited

UNITED STATES PATENTS

| | | | |
|---|---|---|---|
| 2,064,894 | 12/1936 | Espenschied | 325—53 |
| 3,124,657 | 3/1964 | Peterson | 179—81 |
| 3,193,623 | 7/1965 | Burns et al. | 179—41 |
| 3,217,254 | 11/1965 | Hughes et al. | 325—22 |
| 3,277,358 | 10/1966 | Nicholl | 320—59 |
| 3,182,137 | 5/1965 | Beatty | 179—170.8 |
| 3,443,035 | 5/1969 | McCay | 325—55 X |

RICHARD MURRAY, Primary Examiner

B. V. SAFOUREK, Assistant Examiner

U.S. Cl. X.R.

179—41; 320—59; 325—15, 55, 185